(12) United States Patent
Bertocchi (10) Patent No.: US 12,471,615 B2
(45) Date of Patent: Nov. 18, 2025

(54) STRUCTURE OF A ROTOR FOR MACHINES FOR EXTRACTING JUICE AND PUREE FROM FOOD PRODUCTS OF VEGETABLE OR ANIMAL ORIGIN

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 841 days.

(21) Appl. No.: 17/619,161

(22) PCT Filed: Jun. 11, 2020

(86) PCT No.: PCT/IB2020/055499
§ 371 (c)(1),
(2) Date: Dec. 14, 2021

(87) PCT Pub. No.: WO2020/250179
PCT Pub. Date: Dec. 17, 2020

(65) Prior Publication Data
US 2022/0304360 A1    Sep. 29, 2022

(30) Foreign Application Priority Data
Jun. 14, 2019   (IT) .................. 102019000009105

(51) Int. Cl.
*A23N 1/02*   (2006.01)
*A47J 19/02*  (2006.01)

(52) U.S. Cl.
CPC .............. *A23N 1/02* (2013.01); *A47J 19/027* (2013.01); *A47J 19/02* (2013.01)

(58) Field of Classification Search
CPC ............ A47J 19/027; A47J 19/02; A23N 1/02
(Continued)

(56) References Cited

U.S. PATENT DOCUMENTS 2,102,961 A * 12/1937 Lewis ...................... A23N 1/02
                                                        99/513
2,172,790 A *  9/1939 Ferrari ................. A23N 15/025
                                                        99/513
(Continued)

FOREIGN PATENT DOCUMENTS

DE  10 2018 002829 A1  10/2018
EP     2 022 342 A1     2/2009
(Continued)

*Primary Examiner* — Reginald Alexander
(74) *Attorney, Agent, or Firm* — Maschoff Brennan (57) ABSTRACT

A rotor (8) for a machine (1) for extracting puree or juice from a food product of vegetable or animal origin, being provided with a hub (11) having an external conical, or cylindrical, surface (13) from which a plurality of blades (6, $B_{n,m}$) protrudes, in which the hub (11) and the blades (6) form a monolithic body obtained with a process selected from: welding of the blades to the hub, machining of the blades and the hub from a monolithic semi-finished product. The blades (6) are arranged according to a matrix $B_{n,m}$ where n is the number of blades (6) in the longitudinal direction (9) and m is the number of blades (6) along a circumferential direction, where n>≤2 and m≤2; the blades $B_{n,m}$ have at least a concave portion with a concavity oriented in the direction of rotation (10) of the rotor (8). The hub (11) has an axial length (L) and each of the blades $B_{n,m}$ has an axial length A less than L/n with n≤2.

13 Claims, 5 Drawing Sheets

(58) Field of Classification Search
USPC .................................. 99/510, 511, 512, 513
See application file for complete search history.

(56) References Cited

U.S. PATENT DOCUMENTS

| | | | |
|---|---|---|---|
| 2,811,996 A * | 11/1957 | Castellanos | A23N 1/003 |
| | | | 99/626 |
| 4,518,621 A | 5/1985 | Alexander | |
| 4,643,085 A | 2/1987 | Bertocchi | |
| 4,774,097 A | 9/1988 | Bushman et al. | |
| 5,359,926 A | 11/1994 | Sassi | |
| 5,598,772 A | 2/1997 | Catelli | |
| 6,668,710 B2 * | 12/2003 | Catelli | A23N 1/00 |
| | | | 100/127 |
| 2002/0195507 A1 | 12/2002 | Catelli et al. | |

FOREIGN PATENT DOCUMENTS

| | | | | |
|---|---|---|---|---|
| EP | 2 810 568 A1 | 12/2014 | | |
| WO | WO-2005041696 A1 * | 5/2005 | ............... | A23N 1/02 |
| WO | 2010/103376 A2 | 9/2010 | | |
| WO | 2014/015041 A2 | 1/2014 | | |

\* cited by examiner

STRUCTURE OF A ROTOR FOR MACHINES FOR EXTRACTING JUICE AND PUREE FROM FOOD PRODUCTS OF VEGETABLE OR ANIMAL ORIGIN

FIELD OF THE INVENTION

The present invention relates to a structure of rotor for a machine for food industry, and in particular it relates to a structure of rotor for a machine for extracting puree, or of juice, from food products of vegetable, or animal, origin.

The invention, furthermore, relates to a machine for extracting juice and puree from food products of vegetable, or animal, origin equipped with such rotor.

In particular, the invention relates to a machine for extracting juice and puree from food products of vegetable origin that are provided with stones.

BACKGROUND OF THE INVENTION

As well known, the industrial extraction of juice and puree, mainly from the products of vegetable origin, such as fruits and vegetables, but also from products of animal origin, such as meat and fish, is carried out by rotating machines, such as rough extractors and refiner extractors, as for example described in U.S. Pat. No. 4,643,085, WO2010103376A2, both in the name of the same Applicant, or EP2022342, U.S. Pat. No. 5,598,772 and WO2014015041A2.

These rotating machines of prior art comprise, in particular, a rotor mounted on a shaft, which is caused to quickly rotate by a motor group. The rotor is peripherally provided with a series of blades and is mounted within a perforated metal sheet, or sieve, having cylindrical, or conical, shape.

During its rotation about the rotation axis, the rotor applies a centrifugal force to the treated product that causes the same to selectively pass through the sieve.

In this way, the part to be used, i.e. the main product containing the pulp and the puree, is filtered through the holes of the sieve, conveyed and discharged through a first outlet, to be, then, subject, to further treatments. Instead, the part to be wasted, which contain mainly the skins, the stones or the seeds, which cannot pass through the sieve, axially advances from the inlet to the opposite part and reaches a discharge zone positioned downstream of the sieve, through which exits through an outlet mouth arranged downstream of the rotor.

These machines are very versatile because they are able to produce puree or juice from many different kinds of food products, and also for fruits with a hard stone and having a big size, such as peaches, cherries, apricots, mango, avocado, etc.

In the case of treating the stone, from one hand it is desirable not to break the stone same, because it can produce hard fragments, which can damage the machine and give a bad taste to the puree, and from the other hand it is desirable that the stone reaches the zone of the waste products without residues of fruit, in such a way to maximize the extraction yield.

The movement, which better allows the stones to be well "cleaned" from the fruit surrounding the same, is a rolling movement against the sieve. Instead, impacts against surfaces having a sharp edge, or a getting stuck between the blades, or a broken and unsatisfactory "cleaning" of the stones occur when the stone slides without rolling against the surface of the sieve, with a considerable amount of pulp that is still attached to the stone, when it reaches the waste zone.

It is therefore desirable that the blades have a shape that assists the passage of the stones towards the waste zones avoiding that the same can break and at the same time can roll or, anyway, bring all the surfaces of the stones against the sieve, in such a way to remove all the pulp, leaving the stone clean.

A further aspect of this kind of machines is the one of productivity. In order to increase the productivity, it would be necessary to work at 2000-3000 r.p.m, and above. This causes a stronger action on the food product to be extracted, thus increasing the risk of breaking the stones or to obtain waste products containing a big amount of pulp, which has not been extracted, in particular that remains adhered to the stones.

It has been noted that rotors having blades with sharp edges able to hit the stones, as well as rotors having bolts or nuts, or narrow zones where the stones can become stuck, have a greater risk of breaking the stones, especially if the rotor rotates at high speed of rotation.

It is also desirable that the rotors, both of rough extractors and refiner extractors, can be easily cleaned and sanitized, at the end of each working cycle. However, rotors which are constituted by a lot of parts screwed or anyway connected each other in an irreversibly way according to a radial, or axial, direction provide slits and interspaces where juice and pulp can enter or get stuck, thus disassembly and reassembly these parts in order to guarantee a complete hygiene. Furthermore, rotors constituted by many parts that are screwed or connected each other have problems when work at high speeds of rotation.

Therefore, rotors such those shown in U.S. Pat. No. 4,518,621, US2002195507A1, and EP2810568 provide many zones and interspaces that are difficult to clean.

SUMMARY OF THE INVENTION

It is therefore an object of the invention to provide a structure of rotor for a machine for extracting puree, or juice, which is able to reach high yields and speeds avoiding at the same time the aforementioned disadvantages.

It is another object of the invention to provide a similar structure of rotor for a machine for extracting puree that, in case of fruit and other food products with stones and hard parts, is able to maximize the extraction efficiency without breaking the same.

It is another object of the invention to provide a similar structure of rotor for a machine for extracting puree which is able to provide an easy cleaning at the end of each production run without disassembling the parts of the machine.

These and other objects are achieved by a structure of rotor for a machine for extracting puree, or juice, from a food product of vegetable, or animal, origin, said machine comprising, in particular:

an inlet for the food product of vegetable, or animal, origin from which extracting puree, or juice;

a sieve provided with a plurality of holes;

wherein said rotor is configured to be mounted on a motorized shaft and to rotate in a determined direction of rotation, in particular within said sieve, said rotor being provided with a hub having an external surface, advantageously conical, or cylindrical, shaped, from said external surface protruding a plurality of blades, in particular said blades being arranged to apply a centrifugal force to the product fed into said machine through the inlet, in such a way to divide said product in inlet in a main product, comprising said puree, or juice, which passes through said sieve and is discharged through a first outlet, and a waste product, which, instead, does not pass through said sieve and is discharged through a second outlet;

whose main characteristic is that:

said hub and said blades form a monolithic body obtained with a process, advantageously, selected from: welding of said blades to said hub, machining said blades and said hub from a monolithic semi-finished product;

said blades are positioned according to a matrix Bn,m wherein n is a number of blades along an longitudinal direction and m a number of blades along a circumferential direction, wherein n≥2 and m≥2;

said blades Bn,m have at least a concave portion with a concavity oriented in the direction of rotation of said rotor;

said hub has a axial length (L) and each of said blades Bn,m has an axial length A less than L/n, being n≥2;

a blade $B_{n,m}$ is circumferentially staggered from a blade $B_{(n+1),m}$ in such a way that the food product of vegetable, or animal, origin N leaves a blade $B_{n,m}$ in the longitudinal direction according to a substantially helical trajectory T and finds the next blade $B_{(n+1),m}$ at a distance (G).

Other technical characteristics of the present invention and related embodiments are set out in the dependent claims.

In particular, since m≥2 and the distance G even of few cm, when the food product of vegetable, or animal, origin, leaves a blade in the longitudinal direction finds the next blade at the aforementioned distance G and this helps the axial advancing of the product avoiding shuffling. In combination, the fact that the concave shape of at least a portion of blades provides a direction of rotation, allows to fruit stones, or hard portions, from which divides the pulp, to reach the sieve always in a different position. In this way a substantially helical motion T of the food product of vegetable, or animal, origin N, is obtained moving from a blade $B_{n,m}$ to $B_{n,m+1}$ and, then, to $B_{n,m+2}$. In practice, the blades with the same number n bring the food product of vegetable, or animal, origin from inlet 3 to the outlet 4, causing it to slide against the sieve 7, and avoiding that the food product of vegetable, or animal, origin hits the blades with different number n. This determines a flow of the product N from inlet 3 to outlet 4 avoiding shuffling, thus uniformly distributing the extraction work on all the blades 6.

Advantageously, a blade $B_{n+1,m}$ is circumferentially staggered from a blade $B_{n,m+1}$ of a distance F measured along a circumferential direction along the surface of said hub of at least 50 mm and anyway not greater than the planar development of the external surface of the hub corresponding to ¼ of turn, in order to allow the stone to pass in case of large stones.

The fact that the rotor is monolithic allows reaching high rotation speed and to provide a high hygiene, besides of a very quick cleaning at the end of each production run.

Advantageously, a blade $B_{n,m}$ is axially staggered from a blade $B_{(n+1),m}$, in such a way that along a circumferential direction a portion is overlapped for a length equal to S, with S set between 10 mm and 100 mm. In this way, 2 blades one following the other both in the longitudinal and in the circumferential direction are "overlapped" one with respect to the other in projection of said distance S, in such a way that when the food product of vegetable, or animal, origin leaves a blade $B_{n,m}$ finds the blade $B_{(n+1),m}$ staggered backward in the longitudinal direction, and is brought forward from this in longitudinal direction, avoiding retrograde motions of food product in the rotor and, therefore, shuffling which would decrease the extraction efficiency.

Advantageously, the blades are oriented at an angle R opposite to the direction of rotation of the rotor set between 1° and 30°. This shape allows to provide a component of push forward to the food product of vegetable, or animal, origin.

Advantageously, for rotors used for fruits with large stones (for example peach, apricot, mango, avocado, etc.) the number m of the blades along a circumferential direction is set between 2 and 4.

Advantageously, for rotors that are used for fruits with small stone (for example apple, papaya, cherry, plum, etc.) the number m of the blades along a circumferential direction is set between 3 and 8, in particular between 3 and 5.

Advantageously, for rotors that are used for refiners, that means positioned downstream of previous extractions sections, the number m of the blades along a circumferential direction is set between 6 and 16.

In a possible embodiment, in longitudinal direction, between a blade and the following, ridges can be provided which have a radial height lower than the blades, in particular between ⅓ and 1/10 of the blades. This solution allows the stones to pass and, at the same time, provide to the stones an action, which helps their rotation and the pulp removal.

Advantageously, the blades and the ridges, if they are present, have a round edges, in such a way not to cause the stones to be broken.

Advantageously, the last blade of the rotor has a longer length, to cover a final portion in the longitudinal direction of the sieve, and a region of the containing body which faces a waste outlet.

According to another aspect of the invention, a machine for extracting puree, or juice, from a food product of vegetable, or animal, origin, comprises at least a structure of rotor as described above.

BRIEF DESCRIPTION OF THE DRAWINGS

The invention will be now illustrated with the following description of an exemplary embodiment thereof, exemplifying but not limitative, with reference to the attached drawings wherein.

DETAILED DESCRIPTION OF SOME EXEMPLARY EMBODIMENTS OF THE INVENTION

Figure 1:
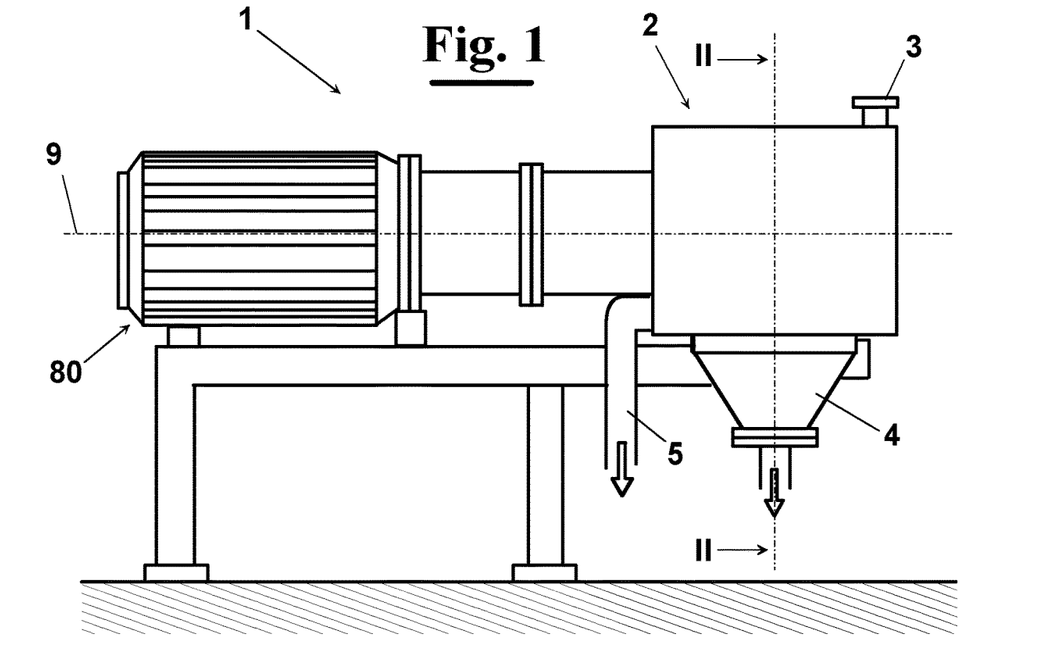
FIG. 1 diagrammatically shows a side elevation view a machine for extracting juice, or puree from food products of vegetable, or animal, origin in which it is possible to install a structure of rotor, according to the invention.
Figure 2:
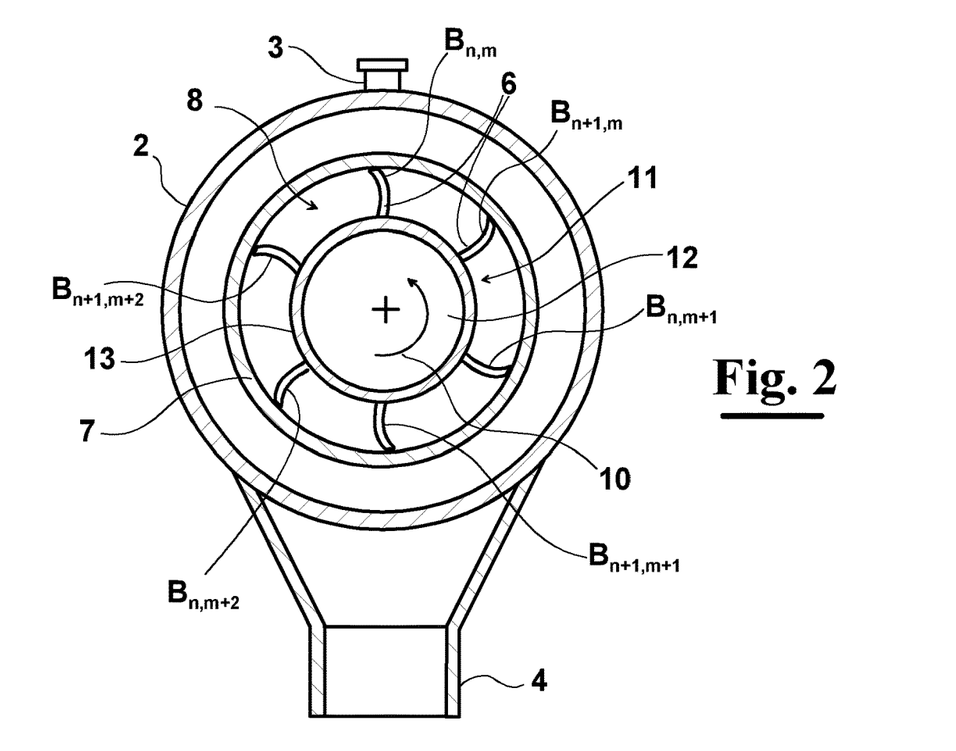
FIG. 2 shows the machine for extracting juice, or puree from food products of vegetable, or animal, origin a cross-section view according to arrows II-II.

In FIG. 1 is shown as an example a possible machine 1 that can be used in plants for producing puree, or juice, starting from food products of vegetable, or animal, origin, such as a rough extruder, or a refiner extruder, in which it is possible to install a structure of rotor, according to the invention. The machine 1 essentially comprises a cylindrical containing body, or "housing", 2 provided with an inlet 3 for the product to be treated, an outlet 4 for the part of product to be used, and an outlet 5 for the part of product to be wasted. The machine 1 is provided with a rotor 8, according to the invention, shown in FIG. 2 and in different embodiments in the following figures from 3 to 10, which is caused to rotate by a motor 80 by a shaft 12. The product introduced into the cylindrical body 2 of the machine 1 through the inlet 3 is forced by the centrifugal force applied by a series of blades 6 of the rotor 8 to pass through a sieve 7 provided with holes (not shown) and having cylindrical, or conical, shape. Also the hub 11 of the rotor 8 can have a cylindrical or conical shape.

According to the invention, the hub 11 and the blades 6 form a monolithic body, in particular obtained with a process selected from the group of: welding of the blades to the hub, machining of the blades and the hub from a monolithic semi-finished product. Furthermore, the blades 6 are arranged according to a matrix $B_{n,m}$ where n is the number of the blades 6, for each value of m, in the axial direction 9 and m is the number of blades 6, for each value of n, along a circumferential direction, where n≥2 and m≥2.

In particular, the blades $B_{n,m}$ can have at least a concave portion with a concavity oriented in the direction of rotation 10 of the rotor 8. More in particular, the hub 11 has an axial length L.

Advantageously, each of the blades $B_{n,m}$ has an axial length A less than L/n con n≥2.

A blade $B_{n,m}$ is, advantageously, circumferentially staggered with respect to a blade $B_{(n+1),m}$ in such a way that the food product of vegetable, or animal, origin N leaves a blade $B_{n,m}$ in longitudinal direction according to a substantially helical trajectory T and finds the following blade $B_{(n+1),m}$ at a distance (G).

Figure 3:
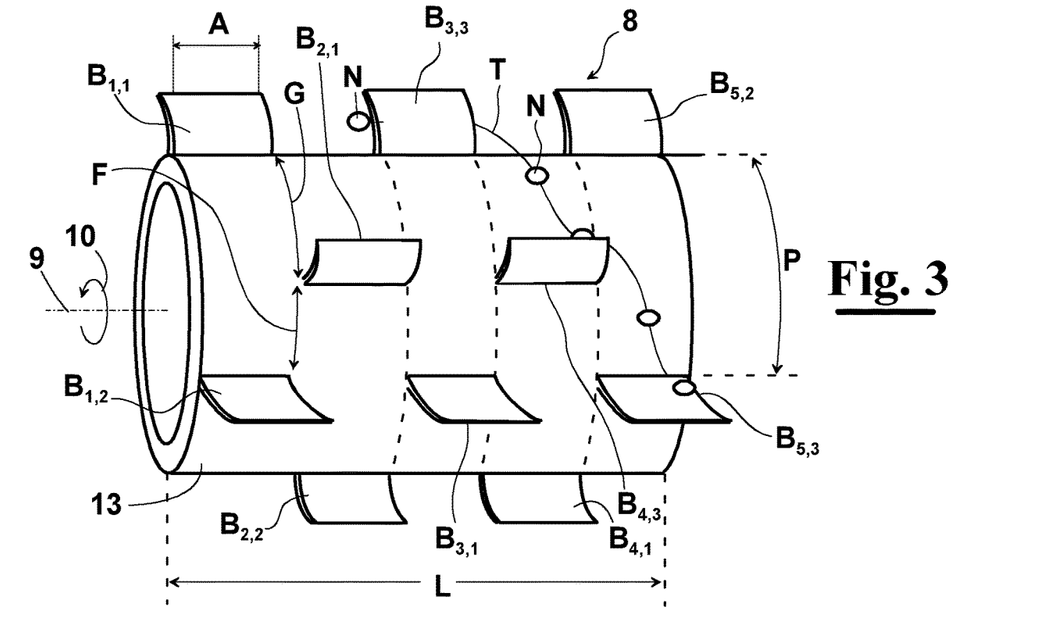
FIG. 3 shows a perspective view of a first embodiment of the rotor of FIG. 2.

In the embodiment of FIG. 3, for example, n can be equal to 5 and m to 3, whilst G can be equal to the distance between $B_{1,1}$ and $B_{1,2}$, that means equal to half of the circumferential distance on the external surface 13 of the hub 11 between two following blades having the same axial number n.

Furthermore, in a possible embodiment, a blade $B_{n+1,m}$ is circumferentially staggered with respect to a blade $B_{n,m+1}$ of a distance F measured along a circumferential direction along the surface of the hub of at least 50 mm and anyway not greater than the planar development of the external surface 13 of the hub 11 corresponding to a quarter of a turn angle, to allow the stones to move over in case of large stones.

In FIG. 3, the sum of the distances G and F corresponds to the pitch P between two blades $B_{n,m}$ and $B_{n,m+1}$.

A substantially helical motion T of the food product of vegetable, or animal, origin, N, is obtained passing from a blade $B_{n,m}$, $B_{n,m+1}$ and $B_{n,m+2}$. In practice, the blades with the same number n bring the food product of vegetable, or animal, origin from the inlet 3 to the outlet 4, causing it to slide against the sieve 7.

Figure 4:
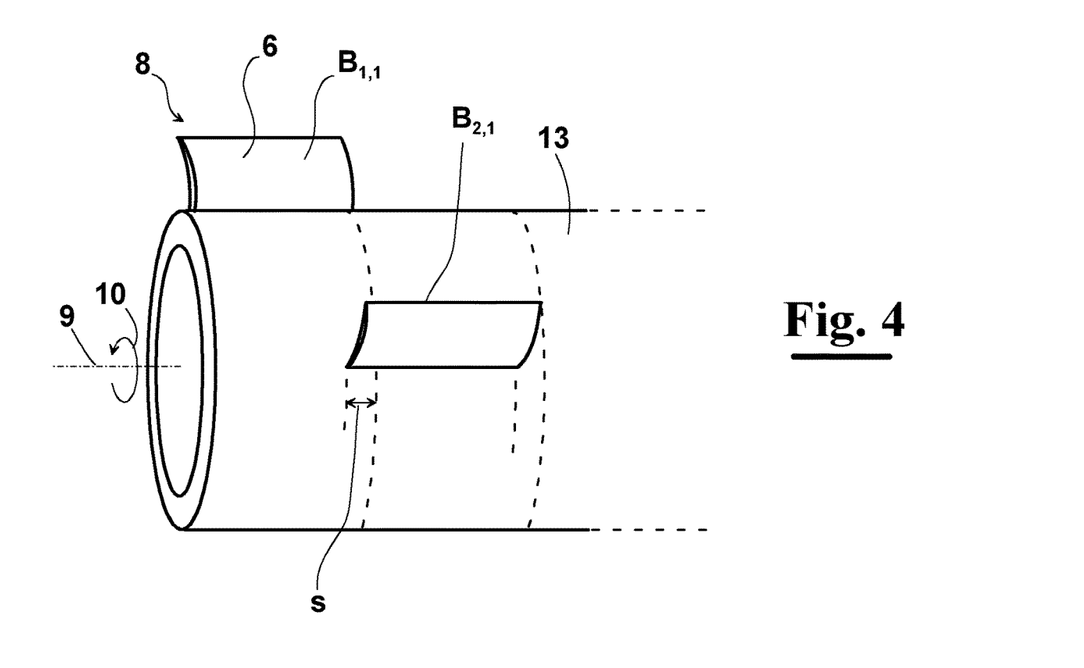
FIG. 4 shows a partial perspective scheme of a possible alternative embodiment provided for the rotor regarding the circumferential overlap of the blades.

As shown in FIG. 4, in a possible embodiment, a blade $B_{n,m}$ is axially staggered with respect to a blade $B_{n+1,m}$ in such a way that along a circumferential direction there is an overlapping length S, in particular with S set between 10 mm and 100 mm. For reasons of simplicity of illustration, in FIG. 4 a rotor analogous to that one of FIG. 3 is shown only partially.

Figure 5:
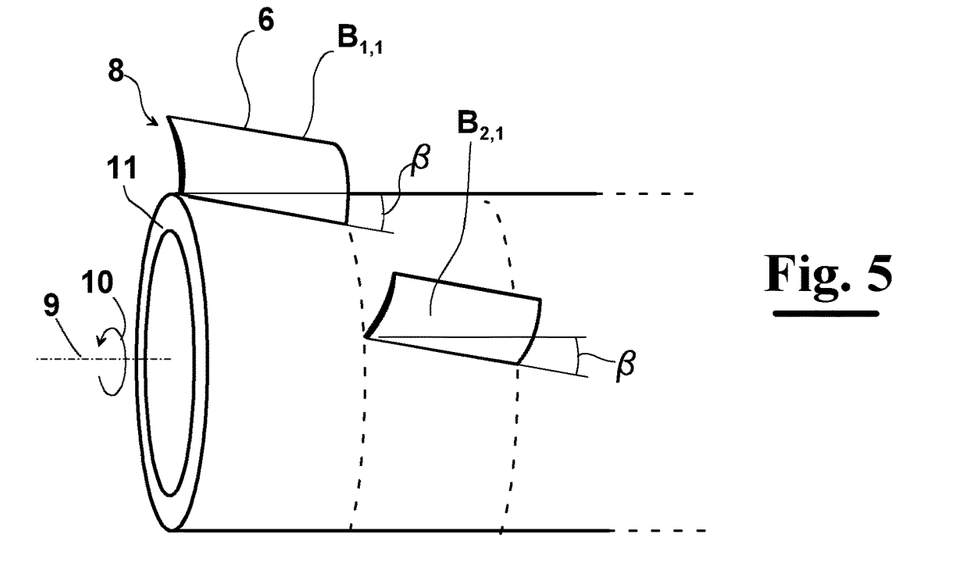
FIG. 5 shows a perspective partial scheme of possible alternative embodiment of the rotor regarding the inclination of the blades with respect to the longitudinal direction of the rotor.

As shown in FIG. 5, in a possible embodiment, the blades 6 of the "matrix" $B_{n,m}$ are oriented at an angle β opposite to the direction of rotation of the rotor set between 1° and 30°. For reasons of simplicity of illustration, in FIG. 5 a rotor analogous to that one of FIG. 3 is shown only partially.

Figure 6:
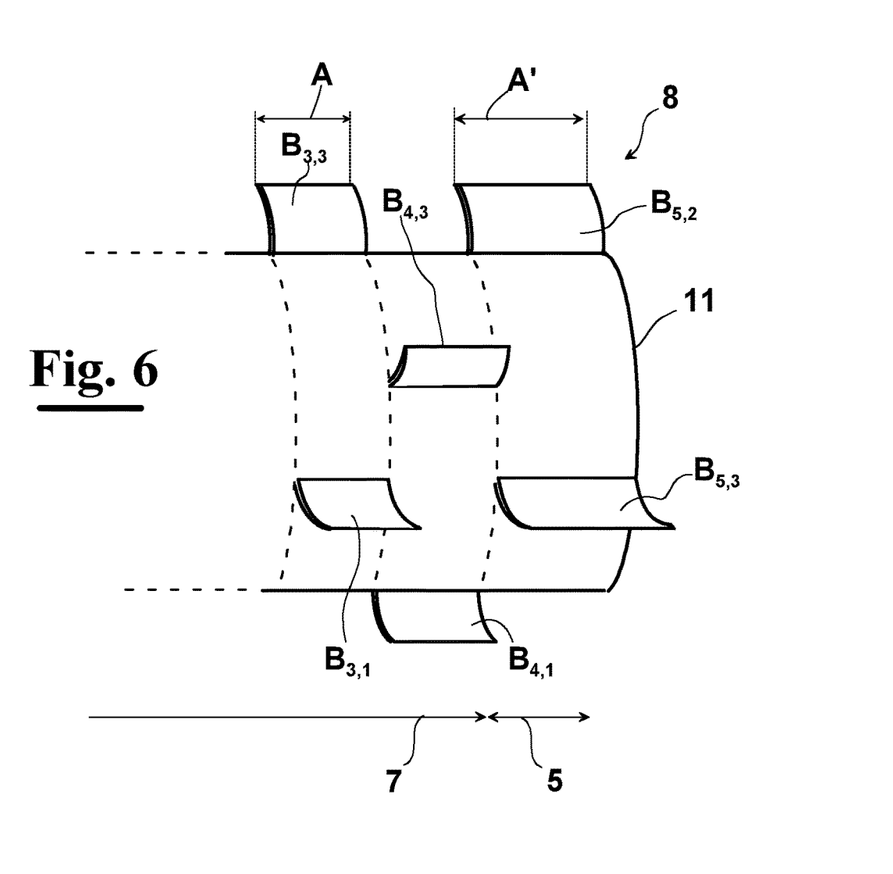
FIG. 6 shows a partial perspective scheme of a possible alternative embodiment of the length of the blades in the end zone in the longitudinal direction of the rotor.

As shown in FIG. 6, in a possible embodiment, the last blade in the longitudinal direction of the rotor has a length longer than those having a smaller number n, in order to cover both a final portion in the longitudinal direction of the sieve 7, and, with the remaining part, a region of the cylindrical containing body 2 which faces a waste outlet 5. For reasons of simplicity of illustration, in FIG. 6 a rotor analogous to that one of FIG. 3 is shown only partially.

Figure 7:
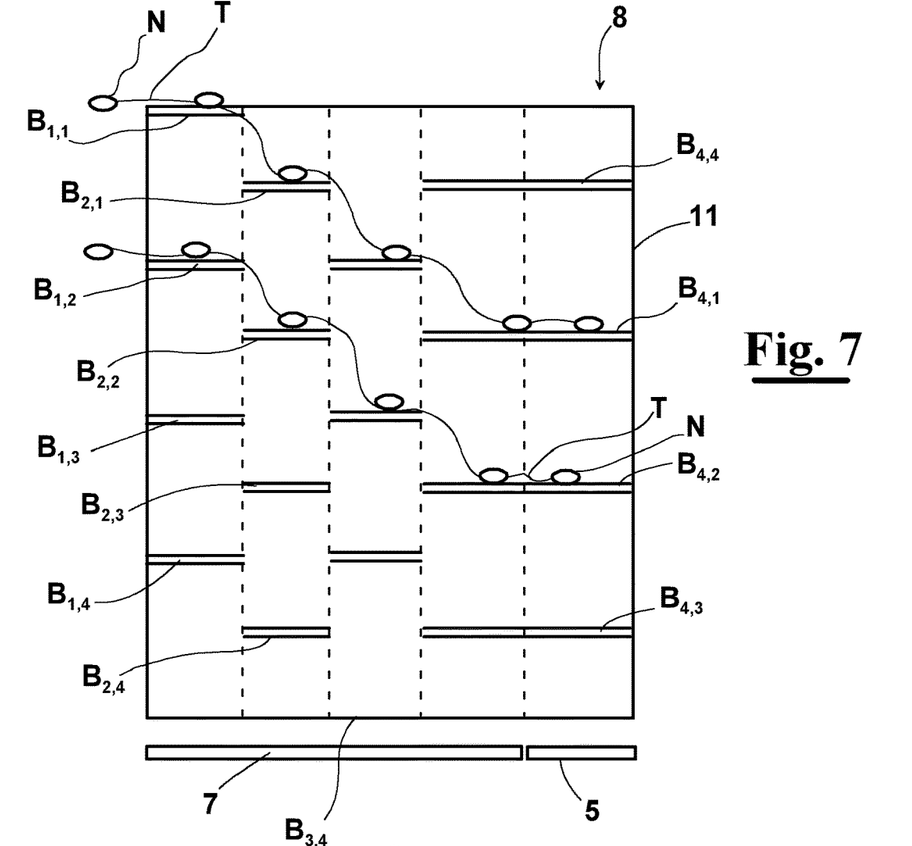
FIG. 7 shows a planar development scheme along a circumferential direction of the rotor in a possible configuration.

As diagrammatically shown in FIG. 7, in a possible embodiment, for rotors that are used for fruits with small stones such as apples, papaya, cherry, plum, etc. the number m of the blades along a circumferential direction can be 4, and for these sizes m can be set between 3 and 8, and in particular between 3 and 5.

Figure 9:
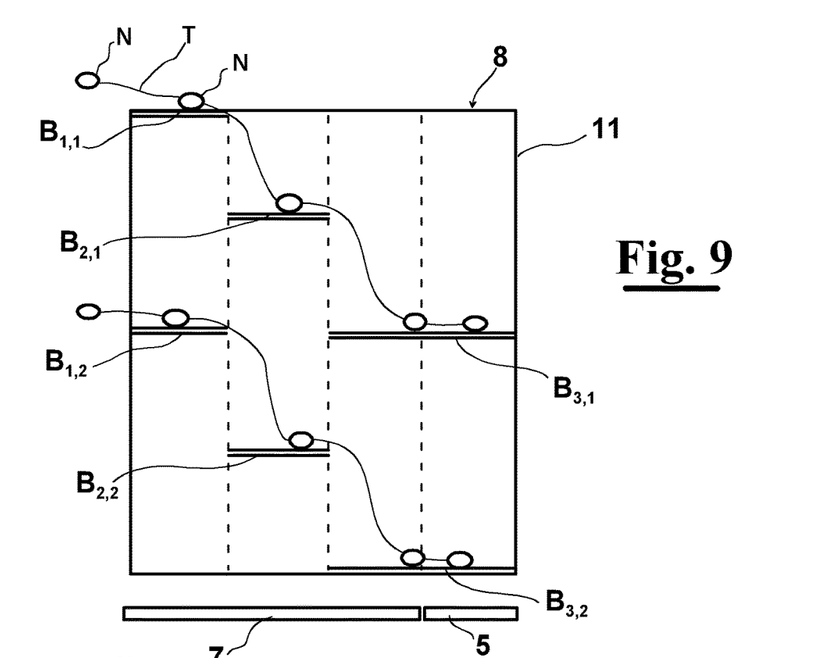
FIG. 9 shows a planar development scheme along a circumferential direction of the rotor in a possible configuration for fruits with stones of medium and big size.

As shown in FIG. 9, in a possible embodiment, for rotors used for fruits with large stones, such as peach, apricot, mango, avocado, etc. the number m of blades along a circumferential direction can be 2, and in other embodiments can be set between 2 and 4.

Figure 10:
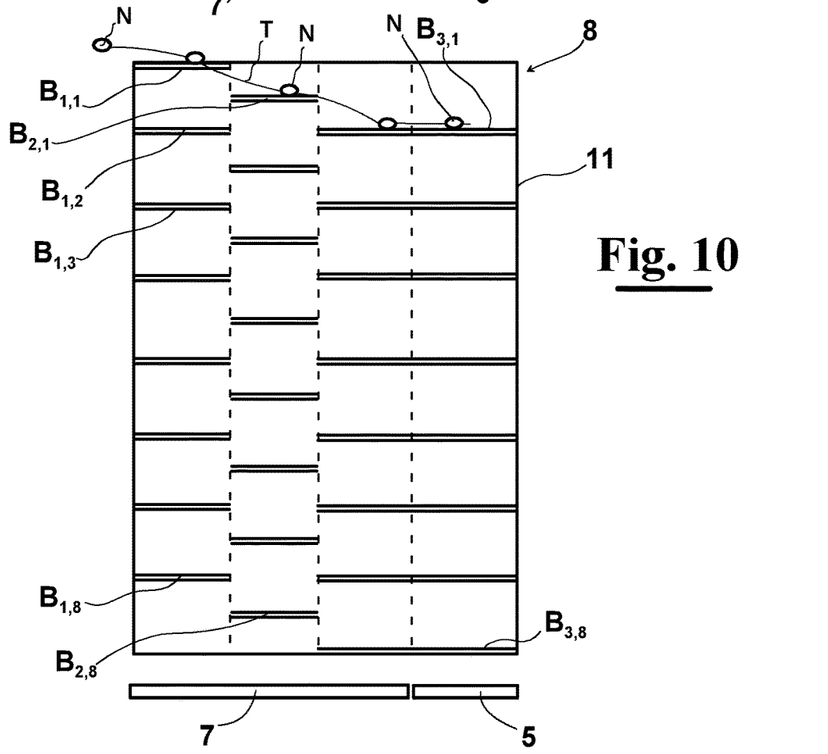
FIG. 10 shows a planar development scheme along a circumferential direction of the rotor in a possible configuration for a refiner extruder.

As shown in FIG. 10, in a possible embodiment, for rotors used for refiner extruders, in particular arranged downstream of extraction sections, the number m of blades along a circumferential direction can be 8, and in further embodiments can be, advantageously, set between 6 and 16.

Figure 8:
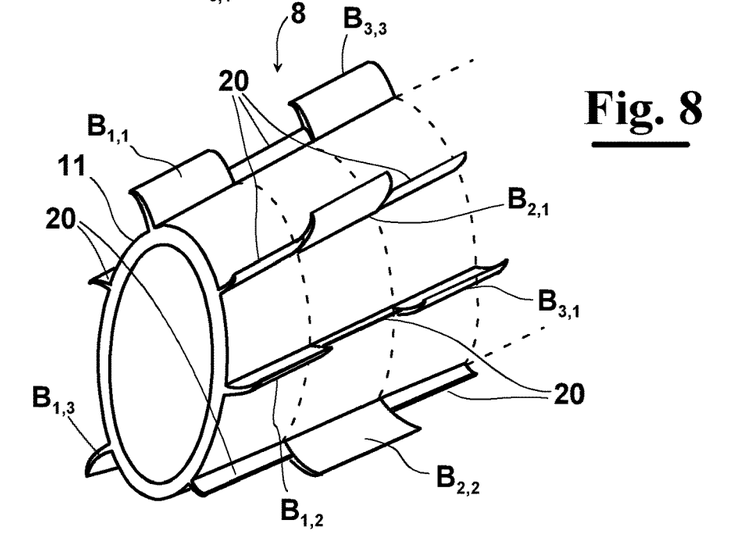
FIG. 8 shows a partial perspective scheme of a possible alternative embodiment of the rotor regarding the ridge portions among the blades in longitudinal direction.

As shown in FIG. 8, in a possible embodiment, in the rotor 8, in the longitudinal direction, between a blade and a next blade, ridges 20 can be provided having a radial height less than the blades 6, in particular between ⅓ and ⅒ of the blades. For reasons of simplicity of illustration, in FIG. 8 a rotor analogous to that one of FIG. 3 is shown only partially.

In all the embodiments, the rotor has, advantageously, round edges.

The solutions shown in the embodiments described above can be also combined with any other embodiment above described and illustrated.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A structure of a rotor for a machine for extracting puree, or juice, from a food product of vegetable origin or animal, said machine comprising:

an inlet for introducing the food product of vegetable or animal origin to be subjected to an extraction operation for producing the puree, or the juice;

a sieve provided with a plurality of holes;

wherein said rotor is configured to be mounted on a shaft connected to a motor, in such a way to rotate within said sieve about a rotation axis in a predetermined direction of rotation, said rotor being provided with a hub having an external conical or cylindrical surface, from said external surface protruding a plurality of blades ($B_{n,m}$) configured to apply a centrifugal force to the product which is fed into said machine through said inlet for dividing the product introduced through the inlet into a main product comprising said puree, or juice, which passes through said sieve and is discharged through a first outlet and into a waste product which, instead, does not pass through said sieve and is discharged through a second outlet;

wherein:

said hub and said blades form a monolithic body obtained with a process selected from: welding of said blades to said hub, machining of said blades and said hub from a monolithic semi-finished product;

said blades are arranged according to a matrix $B_{n,m}$ where n is the number of blades in the longitudinal direction of said axis for each value of m, where m is the number of blades along a circumferential direction for each value of n, where n≥2 and m≥2;

said blades $B_{n,m}$ have at least a concave portion with a concavity oriented in the direction of rotation of said rotor;

said hub has an axial length (L) and each of said blades ($B_{n,m}$) has an axial length (A) less than L/n with n≥2;

a first blade $B_{n,m}$ is circumferentially staggered with respect to a second blade $B(n+1),m$ for causing the food product of vegetable, or animal, origin N to leave the first blade $B_{n,m}$ in the longitudinal direction according to a substantially helical trajectory T, and to find the second blade $B(n+1),m$ at a first distance G;

and wherein the first blade $B_{n,m}$ is axially staggered from the second blade $B(n+1),m$ in such a way that along a circumferential direction there is an overlapping length set between 10 mm and 100 mm.

2. The structure of the rotor according to claim 1, wherein the first blade $B_{n+1,m}$ is circumferentially staggered from the second blade $B_{n,m+1}$ of a second distance F measured along a circumferential direction along the surface of said hub of at least 50 mm and not greater than the planar development of the external surface of the hub corresponding to a quarter of a turn angle, to allow the stones to pass in case of great stones.

3. The structure of the rotor according to claim 1, wherein the blades ($B_{n,m}$) are oriented at an angle opposite to the direction of rotation of the rotor set between 1° and 30°.

4. The structure of the rotor according to claim 1, wherein for rotors used for fruits with large stones the number m of blades along a circumferential direction is set between 2 and 4.

5. The structure of the rotor according to claim 1, wherein for rotors used for fruits with small stones the number of blades along a circumferential direction is set between 3 and 8.

6. The structure of the rotor according to claim 5, wherein for rotors used for fruits with small stones said number of blades along a circumferential direction is set between 3 and 5.

7. The structure of the rotor according to claim 1, wherein, for rotors used for refiner extruders, i.e. downstream of extraction sections, the number of blades along a circumferential direction is set between 6 and 16.

8. The machine for extracting puree, or juice, from a food product of vegetable origin or animal according to claim 1, characterized in that it comprises the rotor according to claim 1.

9. A structure of rotor (8) for a machine (1) for extracting puree, or juice, from a food product of vegetable origin or animal, said machine comprising:

an inlet (3) for introducing the food product of vegetable or animal origin to be subjected to an extraction operation for producing the puree, or the juice;

a sieve (7) provided with a plurality of holes;

wherein said rotor (8) is configured to be mounted on a shaft (12) connected to a motor (80), in such a way to rotate within said sieve (7) about a rotation axis (9) in a predetermined direction of rotation (10), said rotor (8) being provided with a hub (11) having an external conical or cylindrical surface (13), from said external surface (13) protruding a plurality of blades (6, $B_{n,m}$) configured to apply a centrifugal force to the product which is fed into said machine (1) through said inlet (3) for dividing the product introduced through the inlet into a main product comprising said puree, or juice, which passes through said sieve (7) and is discharged through a first outlet (4) and into a waste product which, instead, does not pass through said sieve and is discharged through a second outlet (5);

wherein:

said hub (11) and said blades (6) form a monolithic body obtained with a process selected from: welding of said blades to said hub, machining of said blades and said hub from a monolithic semi-finished product;

said blades (6) are arranged according to a matrix $B_{n,m}$ where n is the number of blades (6) in the longitudinal direction of said axis (9) for each value of m, where m is the number of blades (6) along a circumferential direction for each value of n, where n≥2 and m≥2;

said blades $B_{n,m}$ have at least a concave portion with a concavity oriented in the direction of rotation (10) of said rotor (8);

said hub (11) has an axial length (L) and each of said blades $B_{n,m}$ has an axial length A less than L/n with n≥2;

a blade $B_{n,m}$ is circumferentially staggered with respect to a blade $B(n+1),m$ for causing the food product of vegetable, or animal, origin N to leave a blade $B_{n,m}$ in the longitudinal direction according to a substantially helical trajectory T, and to find the following blade $B(n+1),m$ at a distance G;

and wherein, in longitudinal direction, between a blade and a next blade, ridges (20) are provided which have a radial height less than the blades (6).

10. The structure of the rotor according to claim 9, wherein said ridges have a radial height comprised between ⅓ and 1/10 of the blades.

11. The machine for extracting puree, or juice, from a food product of vegetable origin or animal according to claim 9, characterized in that it comprises a rotor according to claim 9.

12. A structure of rotor for a machine for extracting puree, or juice, from a food product of vegetable origin or animal, said machine comprising:

an inlet for introducing the food product of vegetable or animal origin to be subjected to an extraction operation for producing the puree, or the juice;

a sieve provided with a plurality of holes;

wherein said rotor is configured to be mounted on a shaft connected to a motor, in such a way to rotate within said sieve about a rotation axis in a predetermined direction of rotation, said rotor being provided with a hub having an external conical or cylindrical surface, from said external surface protruding a plurality of blades ($B_{n,m}$) configured to apply a centrifugal force to the product which is fed into said machine through said inlet for dividing the product introduced through the inlet into a main product comprising said puree, or the juice, which passes through said sieve and is discharged through a first outlet and into a waste product which, instead, does not pass through said sieve and is discharged through a second outlet;

wherein:

said hub and said blades form a monolithic body obtained with a process selected from: welding of said blades to said hub, machining of said blades and said hub from a monolithic semi-finished product;

said blades are arranged according to a matrix Bn,m where n is the number of blades in the longitudinal direction of said axis for each value of m, where m is the number of blades along a circumferential direction for each value of n, where n≥2 and m≥2;

said blades Bn,m have at least a concave portion with a concavity oriented in the direction of rotation of said rotor;

said hub has an axial length (L) and each of said blades Bn,m has an axial length A less than L/n with n≥2;

a blade Bn,m is circumferentially staggered with respect to a blade B(n+1),m for causing the food product of vegetable, or animal, origin N to leave a blade Bn,m in the longitudinal direction according to a substantially helical trajectory T, and to find the following blade B(n+1),m at a distance G;

and wherein, the last blade of the rotor has a longer length to cover a final portion in the longitudinal direction of the sieve (7), and to cover with the remaining part a region of the containing body (2) which faces an outlet for the waste products (5).

13. The machine for extracting puree, or juice, from a food product of vegetable origin or animal according to claim 12, characterized in that it comprises a rotor according to claim 12.

* * * * *